United States Patent
Buehlmeier

(10) Patent No.: US 8,231,447 B2
(45) Date of Patent: Jul. 31, 2012

(54) THRESHING UNIT FOR COMBINE HARVESTERS FOR OPTIMIZED CROP CONVEYENCE

(75) Inventor: Robert Buehlmeier, Herzebrock-Clarholz (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 13/090,365

(22) Filed: Apr. 20, 2011

(65) Prior Publication Data
US 2011/0269515 A1 Nov. 3, 2011

(30) Foreign Application Priority Data
Apr. 28, 2010 (DE) .................. 10 2010 016 670

(51) Int. Cl.
*A01F 12/28* (2006.01)
(52) U.S. Cl. .......................................... 460/62; 460/75
(58) Field of Classification Search .................... 460/75, 460/62, 76, 109; 74/745, 335
See application file for complete search history.

(56) References Cited

U.S. PATENT DOCUMENTS

| | | | | | |
|---|---|---|---|---|---|
| 759,391 | A | * | 5/1904 | McGrane | 460/75 |
| 3,593,719 | A | * | 7/1971 | Ashton et al. | 460/73 |
| 3,940,911 | A | * | 3/1976 | Schmitt | 56/14.6 |
| 4,312,365 | A | * | 1/1982 | Claas et al. | 460/62 |
| 4,312,366 | A | * | 1/1982 | De Busscher et al. | 460/76 |
| 4,425,925 | A | * | 1/1984 | Kersting et al. | 460/88 |
| 4,561,805 | A | * | 12/1985 | Laliberte et al. | 406/71 |
| 4,802,496 | A | * | 2/1989 | Bennett | 460/109 |
| 5,167,836 | A | * | 12/1992 | Kylliainen et al. | 210/767 |
| 5,190,497 | A | * | 3/1993 | Heidjann | 460/76 |
| 5,395,287 | A | * | 3/1995 | Coers | 460/113 |
| 5,743,795 | A | * | 4/1998 | Kersting | 460/62 |
| 5,899,121 | A | * | 5/1999 | Mulvihill et al. | 74/745 |
| 6,036,599 | A | * | 3/2000 | Perez-Lopez | 460/85 |
| 6,290,599 | B1 | * | 9/2001 | Eis et al. | 460/62 |
| 6,823,954 | B2 | * | 11/2004 | Shimabukuro et al. | 180/65.25 |
| 6,958,012 | B2 | * | 10/2005 | Duquesne et al. | 460/76 |
| 7,726,108 | B1 | * | 6/2010 | Pruitt et al. | 56/14.5 |
| 2002/0056262 | A1 | * | 5/2002 | Favache | 56/16.4 A |
| 2006/0162307 | A1 | * | 7/2006 | Thompson | 56/30 |
| 2009/0256125 | A1 | * | 10/2009 | Graner et al. | 254/342 |

FOREIGN PATENT DOCUMENTS

| | | |
|---|---|---|
| DE | 196 31 866 | 2/1998 |
| DE | 10 2007 006 926 | 8/2008 |

* cited by examiner

*Primary Examiner* — Arpad Fabian-Kovacs
(74) *Attorney, Agent, or Firm* — Michael J. Striker

(57) ABSTRACT

A threshing unit for combine harvesters has a cylinder, an assigned concave, at least one drum situated downstream of the cylinder, redirecting a threshed crop material out of a threshing region, and conveying it further in a direction of a remaining-grain separating device, wherein threshing slats of the cylinder and slats of at least one downstream drum are situated at a distance from one another in a circumferential region of the cylinder, and wherein peripheral speeds of the cylinder and the drum are synchronized with one another such that in a turning and scraping region the slats of the cylinder and the drum are always positioned opposite each other, or in a leading position that slightly deviates from the position opposite each other, or in a trailing position which slightly deviates from the position opposite each other.

7 Claims, 4 Drawing Sheets

THRESHING UNIT FOR COMBINE HARVESTERS FOR OPTIMIZED CROP CONVEYENCE

CROSS-REFERENCE TO RELATED APPLICATION

The invention described and claimed hereinbelow is also described in German Patent Application DE 10 2010 016 670.7 filed on Apr. 28, 2010. This German Patent Application, whose subject matter is incorporated here by reference, provides the basis for a claim of priority of invention under 35 U.S.C. 119(a)-(d).

BACKGROUND OF THE INVENTION

The present invention relates to a threshing unit for combine harvesters comprising a cylinder, an assigned concave, and at least one drum downstream of the cylinder.

In the case of known single-drum and multiple-drum threshing units of combine harvesters, impellers and/or separating cylinders are always disposed downstream of the cylinder and are used to further convey the threshed crop material to the remaining-grain separating units in the form of straw walkers or rotating separating units. Such impellers and/or separating cylinders are already known in various embodiments and configurations.

For example, document DE 196 31 866 A1 describes a threshing unit for a combine harvester in which an impeller disposed downstream of the cylinder has a revolution or peripheral speed that is dependent on the cylinder. In that particular case, this dependence is adjusted in a stepped manner by way of a transmission, or steplessly by way of a variator transmission.

Furthermore, document DE 10 2007 006 926 A1 makes known a drive device for a cylinder and an impeller, in which the cylinder is driven primarily and, by way thereof, the impeller is driven directly by a V-belt drive, wherein the impeller rotates at a speed or peripheral speed that is the same as or slightly higher than that of the cylinder.

In the case of both known drive variants, however, positioning the cylinder and the impeller relative to one another in a certain manner is neither provided nor even possible, due to the structural design of the drive. Consequently, if a conveyor slat disposed on the periphery of the impeller is situated opposite the intermediate space between two adjacent threshing slats of the cylinder, the impeller slat presses crop material into the intermediate space between the threshing slats, with the result that the crop material is not scraped off adequately and begins to circulate above the cylinder. Likewise, if a threshing slat is located opposite the intermediate space between two adjacent conveying slats of the impeller, the threshing slat of the cylinder presses crop material into the intermediate space between two adjacent conveying slats of the impeller slats. Due to the very large gap between a threshing slat and the impeller, all of the crop material is not transferred, and some crop material therefore begins to circulate above the cylinder.

In both of the aforementioned positions, the result is an impairment of the threshing and conveying process, and a resulting reduction in the output of the combine harvester.

SUMMARY OF THE INVENTION

The problem addressed by the invention is that of optimizing the threshing and conveying process for crop material by way of an advantageous assignment of a drum, which is disposed downstream of the cylinder, to the cylinder.

According to the present invention, the peripheral speeds of adjacent drums are synchronized with each other such that, in the turning and scraping region, the slats of adjacent drums are always positioned opposite each other, or in a leading or trailing position that deviates slightly therefrom. The assignment, according to the invention, of slats of adjacent drums enables crop material to be scraped off extensively by the slats, and results in uninterrupted conveyance to the downstream remaining-grain separating units. As a result, the conveyance of crop material and the course thereof around the cylinder, and the resultant grain damage, are substantially reduced or prevented entirely in the range of action of the cylinder. The invention may be used on single-drum and multiple-drum threshing units comprising downstream straw walkers or rotating remaining-grain separating units.

Advantageously, the position of slats (22, 23) of adjacent drums can be adjusted relative to one another within a range of approximately +/−10% ahead of or behind the other.

In particular, a mechanical, form-locked drive connection can be situated between the adjacent drums. This is used to ensure a slip-free drive of the adjacent drums, in order to maintain a synchronized peripheral speed.

Preferably, a toothed belt or a transmission can be disposed between the adjacent drives, as the form-locked drive connection.

As an alternative, the adjacent drums can be drivable using two separate electric motors which can be controlled using a frequency converter. This drive variant makes it possible to easily adapt the particular peripheral speed of the adjacent drums to the various embodiments of cylinders and drums disposed downstream thereof, such as an impeller and/or a separating cylinder, e.g. in terms of the deviating diameters thereof.

According to a further embodiment, the adjacent drums can be driven hydraulically.

Furthermore, the number of slats of the at least one drum disposed downstream of the cylinder can correspond to the half-integral or integral multiple of the number of threshing slats on the cylinder. In particular, given an integral multiple of the number of slats, the speed of the adjacent drums can be reduced, which would reduce the portion of damaged grain. In contrast, a drive without transmission reduction can be implemented using the same outer circumference of the cylinder and the downstream drum, and the same number of slats, which would have the additional advantage that a positive influence on the portion of damaged grain would also be achieved due to the reduction in speed of the at least one downstream drum relative to a downstream drum which is driven with the same transmission ratio and has the same number of slats and a higher speed than the cylinder. The same applies for the configuration of an impeller and a separating cylinder, which can be disposed downstream of the cylinder.

The invention is explained in greater detail below with reference to an embodiment. In the associated drawings:

DESCRIPTION OF THE PREFERRED EMBODIMENTS

Figure 1:
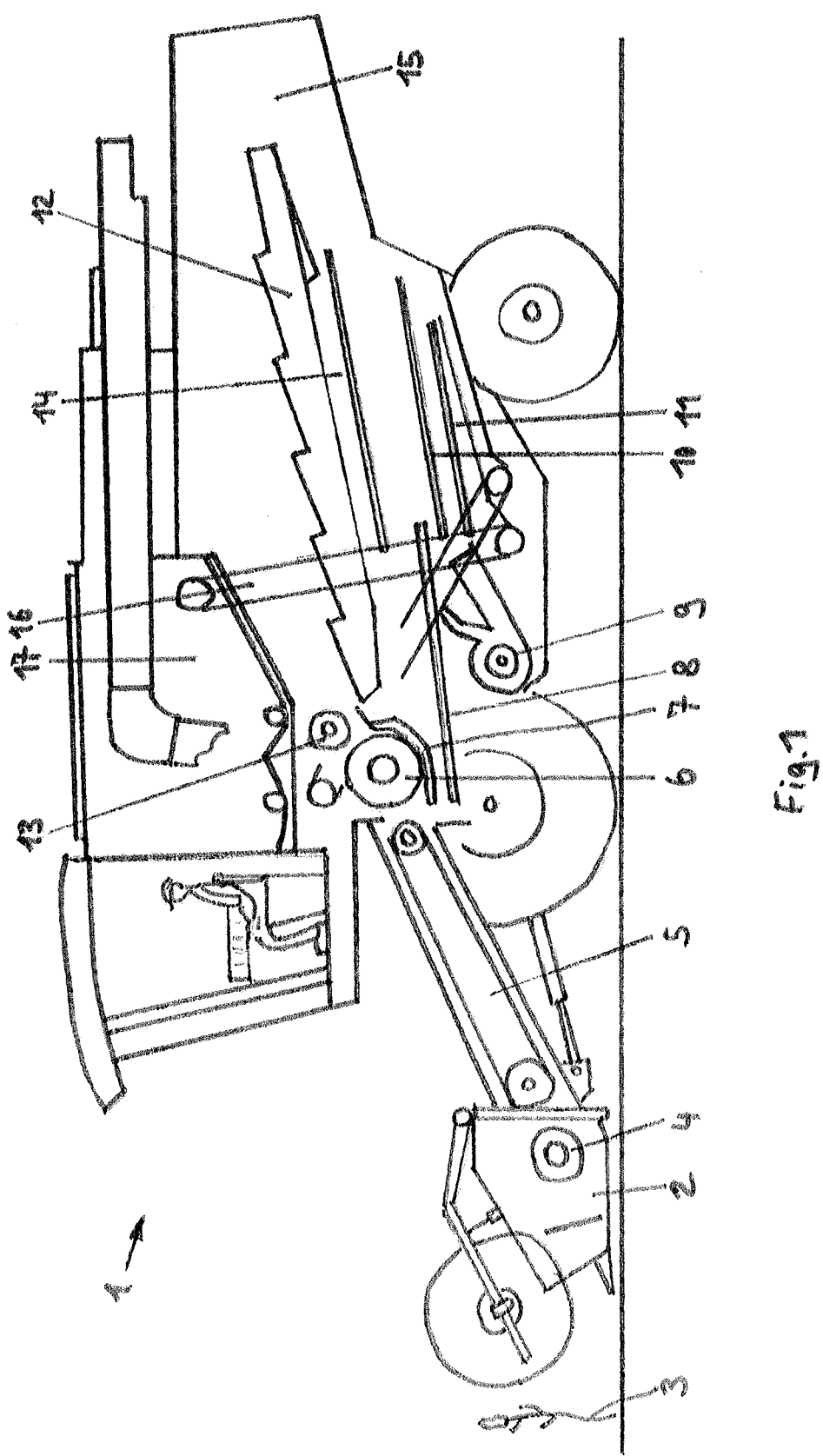
FIG. 1 shows a schematic longitudinal view of a combine harvester.

In the case of self-propelled combine harvester 1 shown in FIG. 1, crop material 3 cut by header 2 is conveyed by way of a feed auger 4 and an obliquely upwardly extending feeder housing 5 to a threshing unit which operates according to the half-tangential principle. Said threshing unit is composed of a cylinder 6 and an assigned concave 7. The grains present in the crops of crop material 3 are threshed between rotating cylinder 6 and stationary concave 7. The grains separated at concave 7 travel, together with the short straw and chaff, by way of a grain pan 8 to a cleaning unit which is composed of a blower 9 and an upper sieve and lower sieve 10; 11, respectively.

To redirect the crop-material components emerging from concave 7 in the tangential direction and transfer same to straw walker 12, an impeller 13 rotating in the counterclockwise direction is disposed parallel to cylinder 6. The separated grains on straw walkers 12, as well as short-straw components and chaff, are conveyed to the cleaning unit by way of a return pan 14 which is mounted in a swinging manner underneath straw walker 12. The longer straw parts are conveyed past the straw walker decks in the direction of straw outlet 15 and, from there, are set down on the field in a swath, or are chopped up by a straw chopper and then spread onto the field using a spreading device. The grains, which have been separated out and cleaned in the cleaning unit, are conveyed by way of an elevator 16 into grain tank 17. The short-straw parts and the chaff are blown by the compressed air flow of blower 9 out of combine harvester 1 to be deposited onto the ground.

Figure 2:
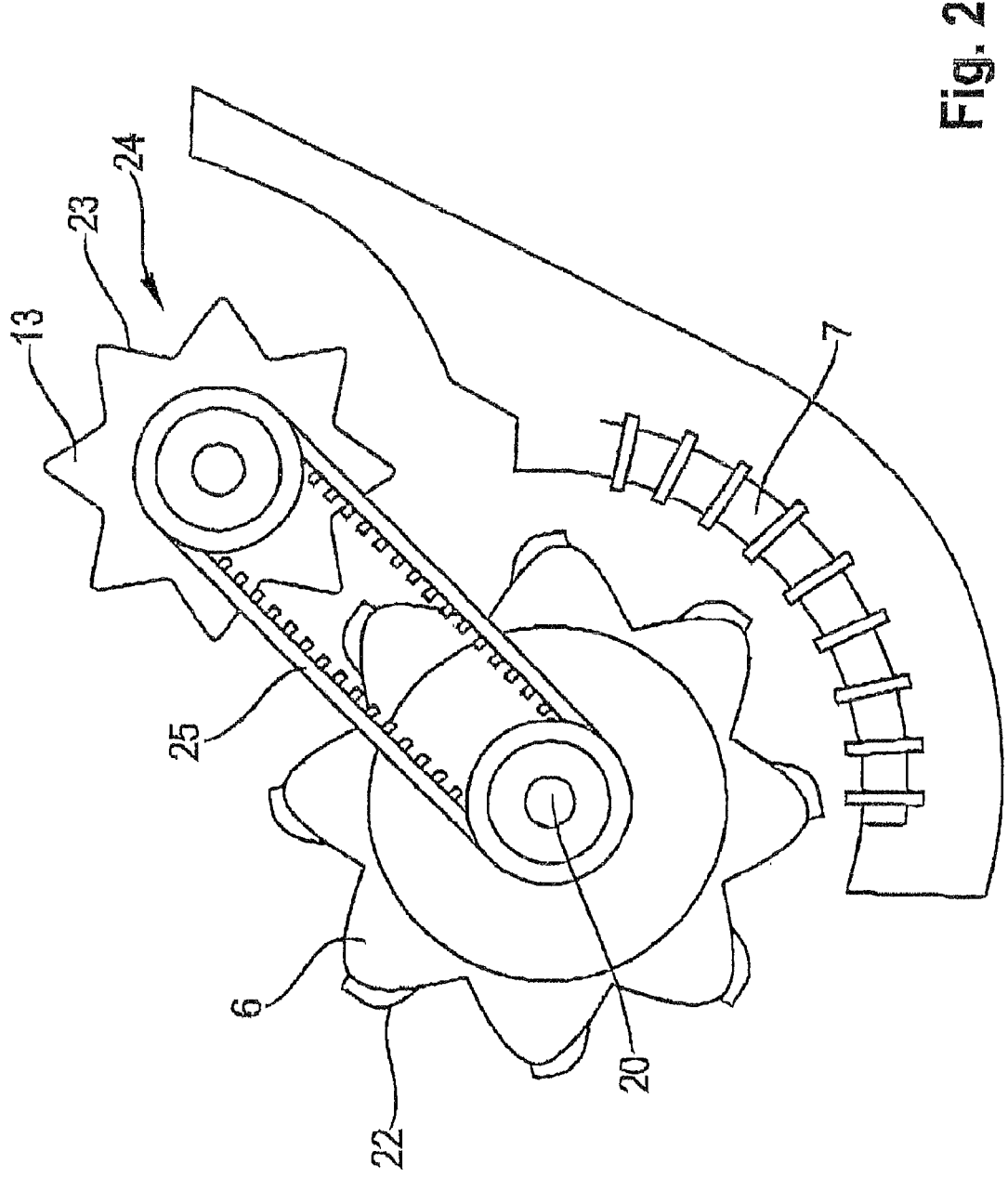
FIG. 2 shows a cross section of the threshing unit.
Figure 3:
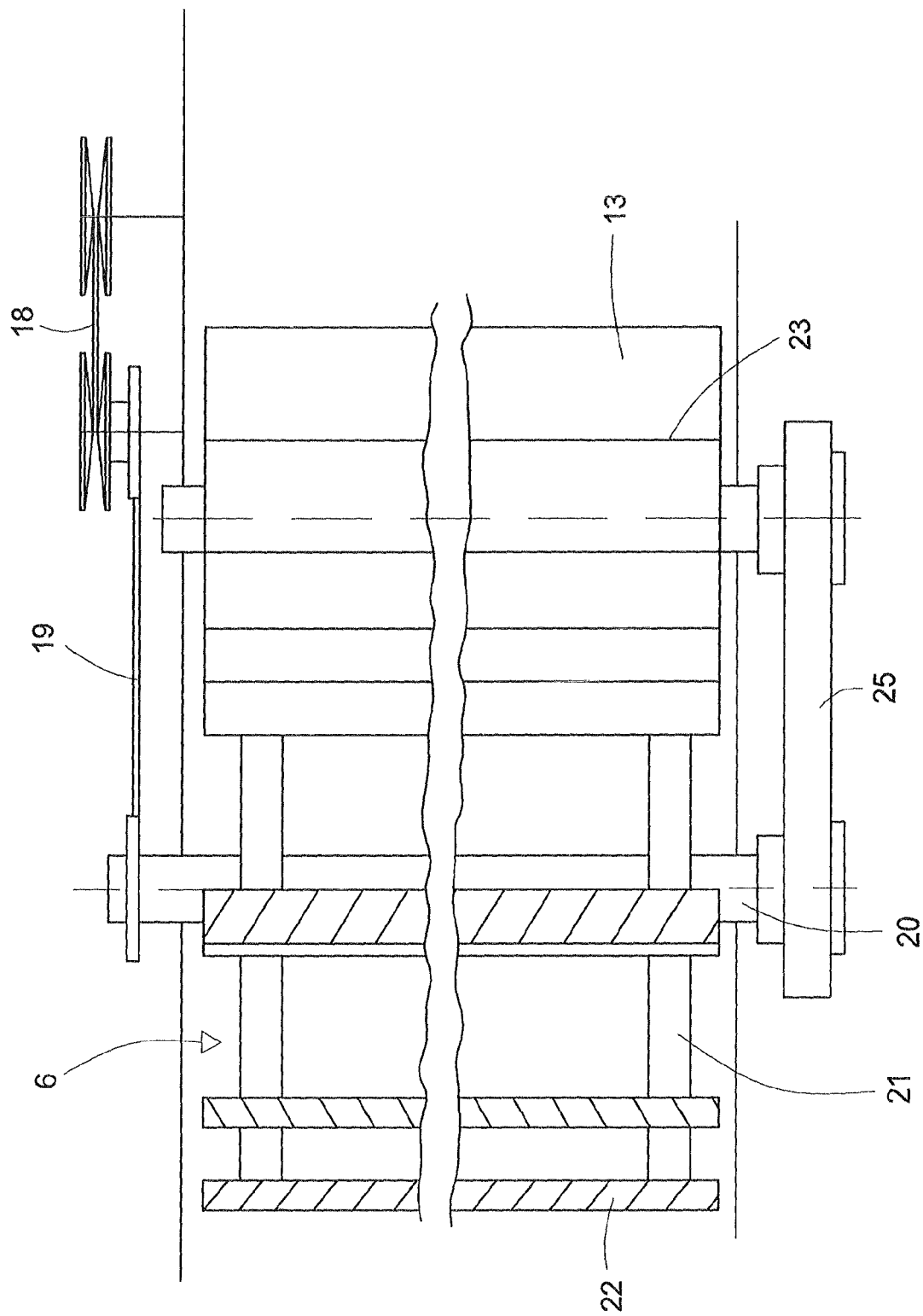
FIG. 3 shows a top view of the cylinder and the impeller with the associated drives.

The threshing unit, which is depicted in FIG. 2 and has the assignment of impeller 13 and cylinder 6 according to the invention, will be described in the following. A plurality of drum discs 21 are disposed across the width of a cylinder shaft 20 which is driven by a steplessly controllable V-belt drive 18 and a further V-belt drive 19 adjoining same. Ribbed threshing slats 22 required for the threshing process are attached at a distance from one another on the outer circumference of profiled drum discs 20 using threaded connections. Impeller 13 assigned to cylinder 6 and comprising a closed drum body is provided on the profiled circumference thereof with a plurality of longitudinally extending conveying slats 23. Intermediate spaces 24 having a lower depth are disposed between every two adjacent conveying slats 23. To scrape the crop material off of cylinder 6 as completely as possible and convey same to straw walkers 12 in an optimal manner, threshing slats 22 of cylinder 6 and conveying slats 23 of impeller 13 are situated relative to one another such that, in the scraping and turning region, they are always positioned opposite each other and the peripheral speeds of cylinder 6 and impeller 13 are synchronized with one another.

Figure 4:
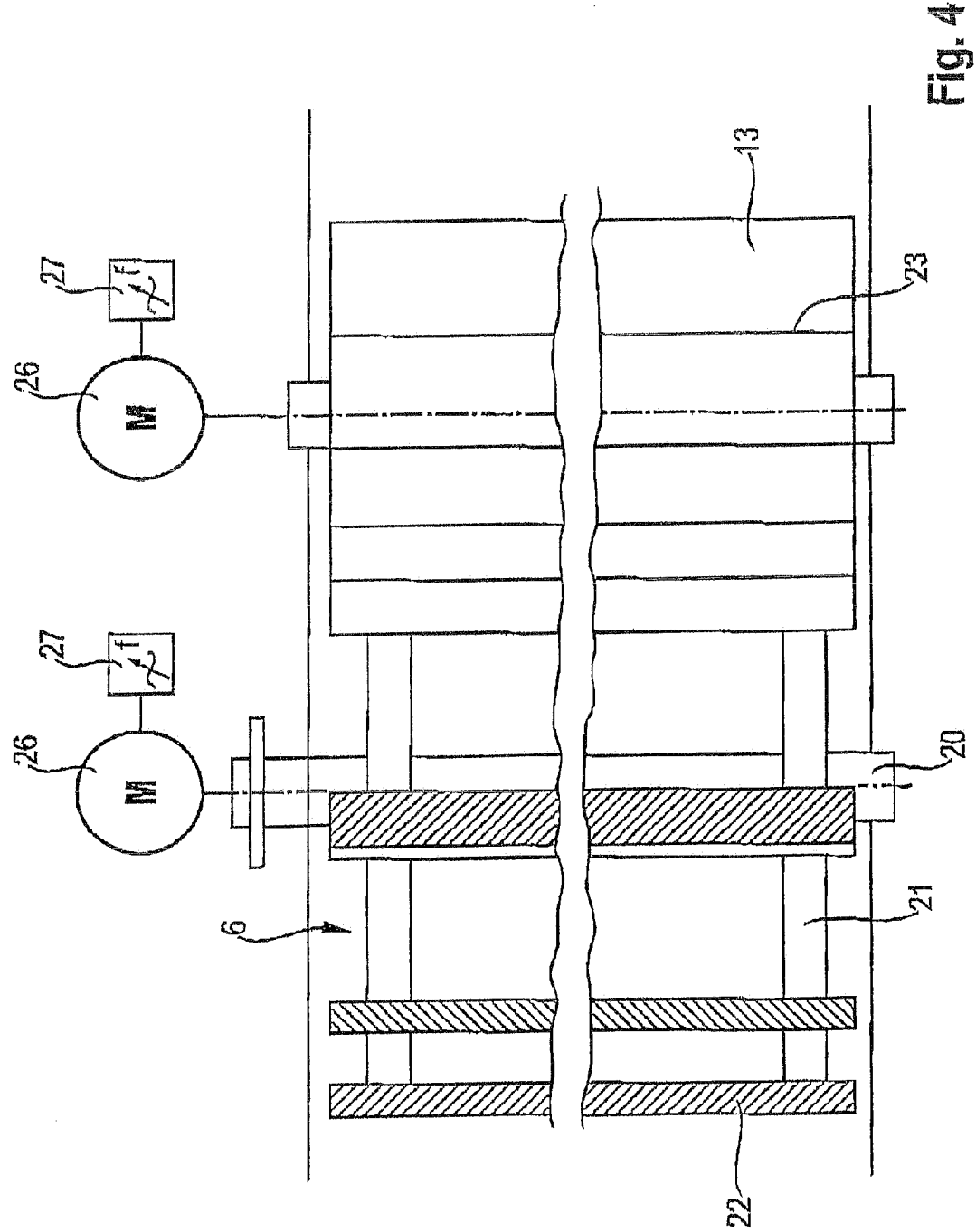
FIG. 4 shows a top view of the cylinder and the impeller with associated motors.

By way of this assignment, an advantageous and uninterrupted flow of crop material between cylinder 6 and straw walkers 12 is attained. Since the exact position setting of threshing slats 22 relative to conveying slats 23 must be maintained to ensure full functionality during the entire operating period, and must not be changed, a slip-free drive is required between cylinder 6 and impeller 13. This is attained by way of a mechanical, form-locked drive connection 25, e.g. using a toothed belt or a transmission connection. According to a further variant embodiment, cylinder 6 and impeller 13 are each driven by a single motor, using electric motors controlled in a synchronized manner. Provided that a slight, function-related leading or trailing position of conveying slats 23 of impeller 13 relative to threshing slats 22 of cylinder 6 of approximately +/− 10% is required, cylinder 6 and impeller 13 are preferably driven by two separate electric motors (26). Each of separate motors (26) can be controlled using a respective frequency converter (27), as shown in FIG. 4.

A synchronized peripheral speed of cylinder 6 and impeller 13 downstream thereof can be easily attained by ensuring that the number of conveying slats 23 corresponds to the half-integral or integral multiple of the number of threshing slats 22. Given the same number of threshing slats 22 and conveying slats 23, as shown in FIG. 2, the drive of impeller 13 situated downstream of cylinder 6 can take place with a 1:1 ratio, provided the diameters of the circular trajectory followed by slats 22, 23 of cylinder 6 and downstream impeller 13 are also the same. Given a deviating ratio of the number of threshing slats 22 and conveying slats 23, and a varying diameter ratio, the speed of cylinder 6 and downstream impeller 13 must be adjusted accordingly in a reciprocal relationship. This can be attained in a particularly simple manner by using single-motor drives.

A plurality of drums downstream of cylinder 6 can also be driven in the manner described above, the peripheral speeds of which should be synchronized with one another, e.g. by way of a configuration of a cylinder, an impeller, and a separating cylinder downstream of the impeller. For this constellation of a multiple-drum threshing unit, the portion of crop material sent into circulation above the cylinder is reduced by synchronizing the peripheral speeds such that the slats of adjacent drums, cylinder 6, and impeller 13, and impeller 13 and a separating cylinder downstream thereof are always positioned, in the turning and scraping region, opposite each other, or in a leading or trailing position that deviates slightly therefrom.

It will be understood that each of the elements described above, or two or more together, may also find a useful application in other types of constructions differing from the types described above.

While the invention has been illustrated and described as embodied in a threshing unit for combine harvesters, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A threshing unit for combine harvesters, comprising
a cylinder;
an assigned concave;
at least one drum situated downstream of the cylinder, redirecting a threshed crop material out of a threshing region, and conveying it further in a direction of a grain separating device;
a mechanical form-locked drive connection disposed between the cylinder and the at least one drum;
wherein threshing slats of the cylinder and slats of the at least one downstream drum are situated at a distance from one another in a circumferential region of the cylinder, and
wherein peripheral speeds of the cylinder and the at least one drum are synchronized with one another by the mechanical form-locked drive connection such that in a turning and scraping region said slats of the cylinder and the at least one drum are always positioned in a position selected from the group consisting of a position opposite each other, a leading position that slightly deviates from the position opposite each other, and a trailing position which slightly deviates from the position opposite each other.

2. The threshing unit as defined in claim 1, wherein the position of said slats of the cylinder and the at least one drum relative to one another are adjusted to either lead or laq the position opposite each other in a range of substantially +/−10%.

3. The threshing unit as defined in claim 1, wherein said form-locked drive connection disposed between the cylinder and the at least one drum is formed as an element selected from the group consisting of a toothed belt and a transmission.

4. The threshing unit as defined in claim 1, further comprising two separate electric motors which drive the cylinder and the at least one drum and are controllable using a frequency converter.

5. The threshing unit as defined in claim 1, wherein the cylinder and the at least one drum are drivable hydraulically.

6. The threshing unit as defined in claim 1, wherein a number of said slats on the at least one drum downstream of the cylinder corresponds to a half or a multiple of a number of said threshing slats of the cylinder.

7. A threshing unit for combine harvesters, comprising
a cylinder;
an assigned concave;
at least one drum situated downstream of the cylinder, redirecting a threshed crop material out of a threshing region, and conveying it further in a direction of a grain separating device;
a mechanical form-locked drive connection disposed between the cylinder and the at least one drum;
wherein threshing slats of the cylinder and slats of the at least one downstream drum are situated at a distance from one another in a circumferential region of the cylinder in an arrangement such that a number of said slats on the at least one drum downstream of the cylinder corresponds to a half or a multiple of a number of said threshing slats of the cylinder, and
wherein peripheral speeds of the cylinder and the at least one drum are synchronized with one another by the mechanical form-locked drive connection such that in a turning and scraping region said slats of the cylinder and the at least one drum are always positioned in a position selected from the group consisting of a position opposite each other, a leading position that slightly deviates from the position opposite each other, and a trailing position which slightly deviates from the position opposite each other.

* * * * *